US012749850B2

(12) United States Patent
Purdy

(10) Patent No.: US 12,749,850 B2
(45) Date of Patent: Sep. 29, 2026

(54) DEVICE FOR IMPEDING UNAUTHORIZED DISSASEMBLY OF AN ENHANCED TAMPER RESISTANT CONNECTOR SECURITY SLEEVE ASSEMBLY

(71) Applicant: PPC BROADBAND, INC., East Syracuse, NY (US)

(72) Inventor: Eric Purdy, Constantia, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 334 days.

(21) Appl. No.: 18/233,931

(22) Filed: Aug. 15, 2023

(65) Prior Publication Data

US 2024/0055804 A1 Feb. 15, 2024

Related U.S. Application Data

(60) Provisional application No. 63/397,949, filed on Aug. 15, 2022.

(51) Int. Cl.

*H01R 13/639* (2006.01)
*H01R 13/627* (2006.01)
*H01R 13/633* (2006.01)

(52) U.S. Cl.

CPC ....... *H01R 13/6397* (2013.01); *H01R 13/627* (2013.01); *H01R 13/633* (2013.01)

(58) Field of Classification Search

CPC .............. H01R 13/6397; H01R 13/627; H01R 13/633; H01R 13/622; H01R 13/623;

(Continued)

(56) References Cited

U.S. PATENT DOCUMENTS 3,953,097 A * 4/1976 Graham .................... H01R 9/05 81/176.15
5,723,818 A * 3/1998 Yeh ......................... H01R 24/40 439/304

(Continued)

FOREIGN PATENT DOCUMENTS

CN 111641078 A 9/2020
DE 102005026148 A2 4/2007

(Continued)

OTHER PUBLICATIONS

Taiwanese Second Office Action dated Oct. 4, 2024 in corresponding Taiwanese Application No. 112130625, 9 pages.

(Continued)

*Primary Examiner* — Edwin A. Leon
(74) *Attorney, Agent, or Firm* — MH2 TECHNOLOGY LAW GROUP LLP; Stuart I. Smith

(57) ABSTRACT

A security sleeve system for a cable connector, includes: a first portion that may engage a tightening portion of a cable connector; and a second portion that may engage the first portion. The first portion may be configured to engage the tightening portion such that rotation of the first portion in a tightening direction causes the tightening portion to rotate; the first portion and the second portion may be configured to receive a tool that impedes rotation of the second portion relative to the first portion to cause the tightening portion to rotate in a loosening direction; the second portion may be configured to rotate relative to the first portion when the tool is not received in the first portion; and the first portion and the second portion may be configured to provide tool-less tightening of the cable connector to a mating part but are configured to use a tool to loosen the cable connector from the mating part.

33 Claims, 6 Drawing Sheets

(58) Field of Classification Search

CPC ...... H01R 9/05; H01R 24/40; H01R 2103/00; H01R 9/0521; H01R 43/20; H01R 2201/18

See application file for complete search history.

(56) References Cited

U.S. PATENT DOCUMENTS

| | | | | |
|---|---|---|---|---|
| 6,123,563 | A | 9/2000 | Johnson et al. | |
| 7,033,195 | B2 * | 4/2006 | Murphy | H01R 24/40 439/307 |
| 7,086,876 | B1 * | 8/2006 | Montena | H01R 13/6397 439/304 |
| 7,914,311 | B1 | 3/2011 | Gallusser et al. | |
| 8,062,064 | B2 * | 11/2011 | Rodrigues | H01R 13/622 439/578 |
| 8,070,504 | B2 | 12/2011 | Amidon et al. | |
| 8,172,611 | B1 * | 5/2012 | Montena | H01R 13/6397 439/578 |
| 8,235,751 | B2 | 8/2012 | Amidon et al. | |
| 9,203,180 | B2 | 12/2015 | Mosier et al. | |
| 9,666,973 | B1 | 5/2017 | Strahl | |
| 10,340,631 | B1 | 7/2019 | Hung et al. | |
| 11,283,217 | B2 | 3/2022 | Montena et al. | |
| 2012/0100751 | A1 | 4/2012 | Montena | |
| 2023/0198203 | A1 | 6/2023 | Kopinski et al. | |
| 2024/0055804 | A1 | 2/2024 | Purdy | |

FOREIGN PATENT DOCUMENTS

| | | | |
|---|---|---|---|
| EP | 3582338 | A1 | 12/2019 |
| TW | 151160 | B | 2/1991 |
| WO | 2017219042 | A1 | 12/2017 |

OTHER PUBLICATIONS

International Search Report and Written Opinion dated Nov. 15, 2023 in corresponding International Application No. PCT/US2023/030192, 16 pages.

* cited by examiner

DEVICE FOR IMPEDING UNAUTHORIZED DISSASEMBLY OF AN ENHANCED TAMPER RESISTANT CONNECTOR SECURITY SLEEVE ASSEMBLY

CROSS-REFERENCE TO RELATED APPLICATION

This application claims the benefit of U.S. Provisional Application No. 63/397,949 filed Aug. 15, 2022, the disclosure of which is hereby incorporated by reference herein in its entirety.

BACKGROUND

The present invention relates generally to cable connection tamper resistance. More particularly, the present invention relates to a system for resisting tampering with a cable connection (for example, a terminal connector on a coaxial cable).

Occasionally, customers of the providers disconnect the modem (or other device) from the wall-mounted connector and take the modem with them to their next residence or other service location. The providers would like to stop this practice by securing the modem to the wall-mounted connector. Conventional jumpers can be hand-tightened and hand-loosened and/or can be tightened and loosed with a wrench.

It may be desirable to provide systems that increase the difficulty associated with disconnecting a cable from a connection. For example, it may be desirable to provide a connector that: snaps together but cannot be disassembled; is designed to not be engageable by a wrench; and allows tightening without a tool, but is configured to use a tool for loosening, where the type of tool used is not readily apparent.

SUMMARY

Examples of the present disclosure provides a two-part security sleeve system that snaps together around a cable connector, such as, for example, a coaxial cable connector, and allows the connector to be hand tightened to a mating connector, but not removed from the mating connector unless a tool is used. Internet service providers, for example, provide a device such as, for example, a modem, that is connected to a wall-mounted connector by a length of cable. Occasionally, customers of the providers disconnect the modem (or other device) from the wall-mounted connector and take the modem with them to their next residence or other service location. The providers would like to stop this practice by securing the modem to the wall-mounted connector.

Exemplary embodiments of the disclosure include two security parts that come together from opposite ends of the connector and snap together encompassing the connector. An inner part, or body, has a hexagonal-shaped cutout that is sized to go around, and engage, a hex nut of the connector. This engagement allows tightening of the connector to a mating connector when the inner part is turned in a tightening direction (for example, a clockwise direction). In embodiments, an outer part, or body, has a number of recesses located in an inner surface that are configured to engage a number of lobes on an outer surface of the inner part when the outer part is turned in the tightening direction. In embodiments, the lobes are located at ends of flexible fingers and, as a result, are structurally configured to flex inwardly (toward a central axis of the connector and security sleeve) when subjected to inward force resulting from the lobes contacting the inner surface of the outer part at locations other than the recesses. As a result of the outer part being turned in a direction opposite to the tightening direction ("loosening direction") (for example, a counterclockwise direction), the lobes are pressed inwardly (by their interaction with the inner surface of the outer part) such that they do not engage the recesses, allowing the outer part to rotate relative to the inner part. This relative rotation prevents the rotation being applied to the outer part from being transmitted to the inner part which, in turn, prevents the connector from being rotated and, therefore prevents the connector from being disconnected from the mating connector. In embodiments, the inner and outer parts, once snapped together, cannot be detached from each other without damaging one or both parts, or without using a special tool.

In embodiments, the inner and outer parts have a number of holes extending in a direction perpendicular to the central axis of the connector and offset from the center axis. In embodiments, to enable rotation of the connector in the loosening direction, a tool (for example, a paper clip) is inserted in the holes. The tool engages flats or other surfaces of, for example, the hex nut of the connector such that the hex nut is rotationally locked to the outer part and, as a result, the connector is turned in the loosening direction. This allows the connector to be disconnected from the mating connector. Such embodiments prevent the connector from being disconnected from the mating connector unless the tool is used by a knowledgeable user.

The present disclosure provides a security sleeve system for a cable connector, that may include: an inner portion that may be structurally configured to engage a tightening portion of a cable connector; and an outer portion that may be structurally configured to receive the inner portion. The inner portion may comprise a tightening portion engagement portion that may be structurally configured to engage the tightening portion of the cable connector such that rotation of the inner portion causes the tightening portion to rotate; the inner portion may comprise a rotary engagement portion that may be structurally configured to flex in a radial direction; the inner portion may comprise an axial engagement portion that may include an engagement protrusion at an end of the axial engagement portion; the axial engagement portion may be structurally configured to flex in a radial direction; the outer portion may comprise an engagement protrusion engaging portion; the engagement protrusion of the axial engagement portion may be structurally configured to engage the engagement protrusion engaging portion to limit axial movement of the inner portion relative to the outer portion; the outer portion may comprise an engagement portion that may be configured to engage the rotary engagement portion to transfer rotation of the outer portion in a tightening direction to the inner portion; the engagement portion of the outer portion may be structurally configured to press a sloped portion of the rotary engagement portion radially inward as a result of the outer portion being rotated in a loosening direction that is opposite to the tightening direction so as to impede rotation of the outer portion in the loosening direction from being transferred to the inner portion; outer portion may comprise a tool receiving portion; the inner portion may comprise a tool receiving portion; when the tool receiving portions of the outer portion and the inner portion may be aligned, the tool receiving portions of the outer portion and the inner portion may be structurally configured to receive a tool that impedes rotation of the outer portion relative to the inner portion so as to allow the inner portion to cause the tightening portion of the cable connector to rotate in the loosening direction; and the inner portion and the outer portion may be structurally configured to provide tool-less tightening of the cable connector to a mating part but may be structurally configured to use a tool to loosen the cable connector from the mating part such that unauthorized disassembly of the cable connector from the mating part is impeded.

In particular embodiments, the sloped portion may be structurally configured as a ramp.

In particular embodiments, the rotary engagement portion may be structurally configured to extend axially from the inner portion.

In particular embodiments, the rotary engagement portion may comprise a sloped portion at an end of the rotary engagement portion, and the sloped portion may comprise a face at a tall end of the sloped portion.

In particular embodiments, the axial engagement portion may be structurally configured to extend axially from the inner portion.

In particular embodiments, the engagement protrusion engaging portion may be structurally configured to extend radially inward from an inner surface of the outer portion.

In particular embodiments, the engagement protrusion engaging portion may comprise a ledge.

In particular embodiments, the tightening portion engagement portion may comprise a plurality of tightening portion engagement portions.

In particular embodiments, the tightening portion of the cable connector may comprise a hex nut.

In particular embodiments, the rotary engagement portion may comprise a plurality of rotary engagement portions.

In particular embodiments, the rotary engagement portions may be rotary engagement fingers.

In particular embodiments, the axial engagement portion may comprise a plurality of axial engagement portions.

The present disclosure provides a security sleeve system for a cable connector that may include: an inner portion that may be structurally configured to engage a tightening portion of a cable connector; and an outer portion that may be structurally configured to selectively engage the inner portion. The inner portion may comprise a tightening portion engagement portion that may be structurally configured to engage the tightening portion of the cable connector such that rotation of the inner portion causes the tightening portion to rotate; the inner portion may comprise an engagement portion; the outer portion may comprise an engagement portion engaging portion that may be structurally configured to engage the engagement portion engaging portion to limit axial movement of the inner portion relative to the outer portion; the outer portion may comprise an engagement portion that may be configured to engage the inner portion to transfer rotation of the outer portion in a tightening direction to the inner portion; the outer portion may comprise a tool receiving portion; the inner portion may comprise a tool receiving portion; the tool receiving portions of the outer portion and the inner portion may be structurally configured to receive a tool that impedes rotation of the outer portion relative to the inner portion to cause the tightening portion of the cable connector to rotate in the loosening direction; and the security sleeve system may provide tool-less tightening of the cable connector to a mating part but may be structurally configured to use the tool to loosen the cable connector from the mating part such that unauthorized disassembly of the cable connector from the mating part is impeded.

In particular embodiments, the inner portion may comprise a rotary engagement portion.

In particular embodiments, the rotary engagement portion may be structurally configured to flex in a radial direction.

In particular embodiments, the engagement portion of the inner portion may comprise an axial engagement portion.

In particular embodiments, the axial engagement portion may comprise an engagement protrusion at an end of the axial engagement portion.

In particular embodiments, the axial engagement portion may be structurally configured to flex in a radial direction.

In particular embodiments, the engagement portion of the outer portion may be structurally configured to press a sloped portion of the rotary engagement portion radially inward as a result of the outer portion being rotated in a loosening direction that is opposite to the tightening direction.

In particular embodiments, the pressing of the sloped portion radially inward may impede the rotation of the outer portion in the loosening direction from being transferred to the inner portion.

In particular embodiments, when the tool receiving portions of the outer portion and the inner portion may be aligned, the tool receiving portions of the outer portion and the inner portion may be structurally configured to receive the tool.

The present disclosure provides a security sleeve system for a cable connector that may include: a first portion that may be structurally configured to engage a tightening portion of a cable connector; and a second portion that may be structurally configured to selectively engage the first portion. The first portion may be structurally configured to engage the tightening portion of the cable connector such that rotation of the first portion in a tightening direction causes the tightening portion to rotate; the first portion and the second portion may be structurally configured to receive a tool that impedes rotation of the second portion relative to the first portion to cause the tightening portion of the cable connector to rotate in the loosening direction; the second portion may be structurally configured to rotate relative to the first portion when the tool is not received in the first portion; and the first portion and the second portion may be structurally configured to provide tool-less tightening of the cable connector to a mating part but may be structurally configured to use a tool to loosen the cable connector from the mating part such that unauthorized disassembly of the cable connector from the mating part is impeded.

In particular embodiments, the first portion may be an inner portion.

In particular embodiments, the second portion may be an outer portion.

In particular embodiments, the first portion may comprise an engagement portion, and the second portion may comprise an engagement portion engaging portion.

In particular embodiments, the engagement portion of the first portion may be structurally configured to engage the engagement portion engaging portion to limit axial movement of the first portion relative to the second portion.

In particular embodiments, the second portion may comprise an engagement portion, and the engagement portion of the second portion may be configured to engage the first portion to transfer rotation of the second portion in the tightening direction to the first portion.

Various aspects of the system, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

Embodiments of the disclosure provide a two-part security sleeve system that snaps together around a cable connector, such as, for example, a coaxial cable connector, and allows the connector to be hand tightened to a mating connector, but not removed (or easily removed) from the mating connector unless a tool is used, thereby preventing unauthorized disconnection of the connector. This provides, in embodiments, the functional result of a tamper resistant security sleeve system that prevents removal of a coaxial connector from a mating connector or port unless a user is aware of the procedure of removal, and the procedure of removal uses a tool that is easily fabricated from a household object such as a paper clip.

Figure 1:
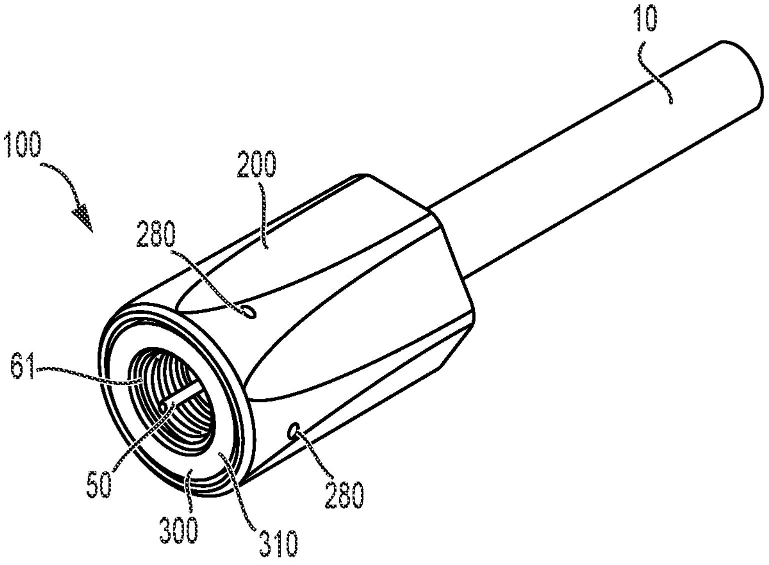
FIG. 1 is a perspective view of an exemplary tamper resistant connector security sleeve in accordance with various aspects of the disclosure in an installed state.
Figure 2:
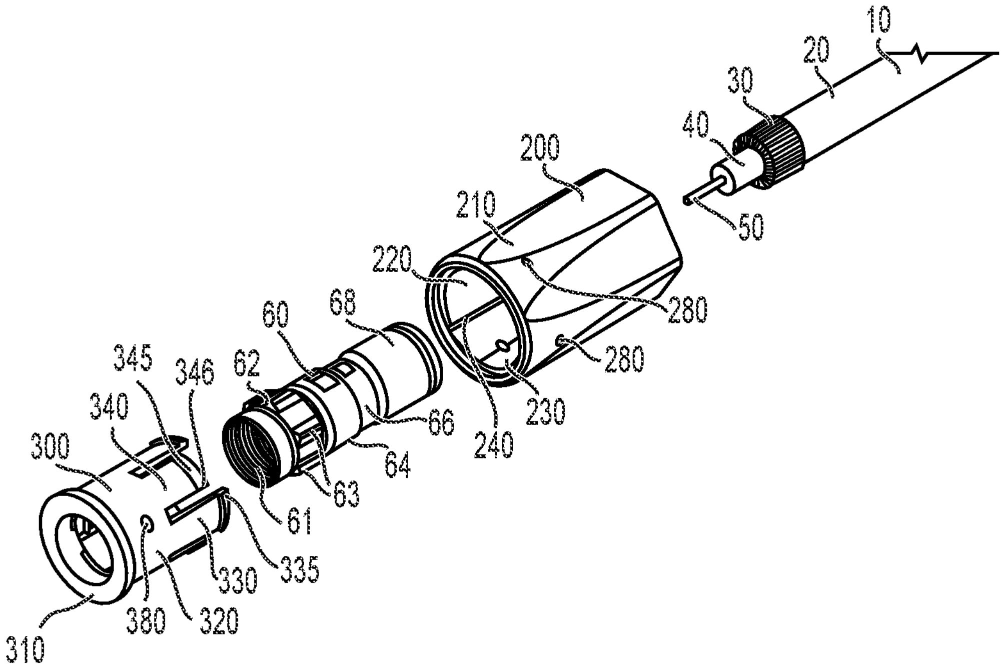
FIG. 2 is an exploded perspective view of the tamper resistant connector security sleeve of FIG. 1 with the connector in an expanded state prior to connection to the cable.
Figure 3:
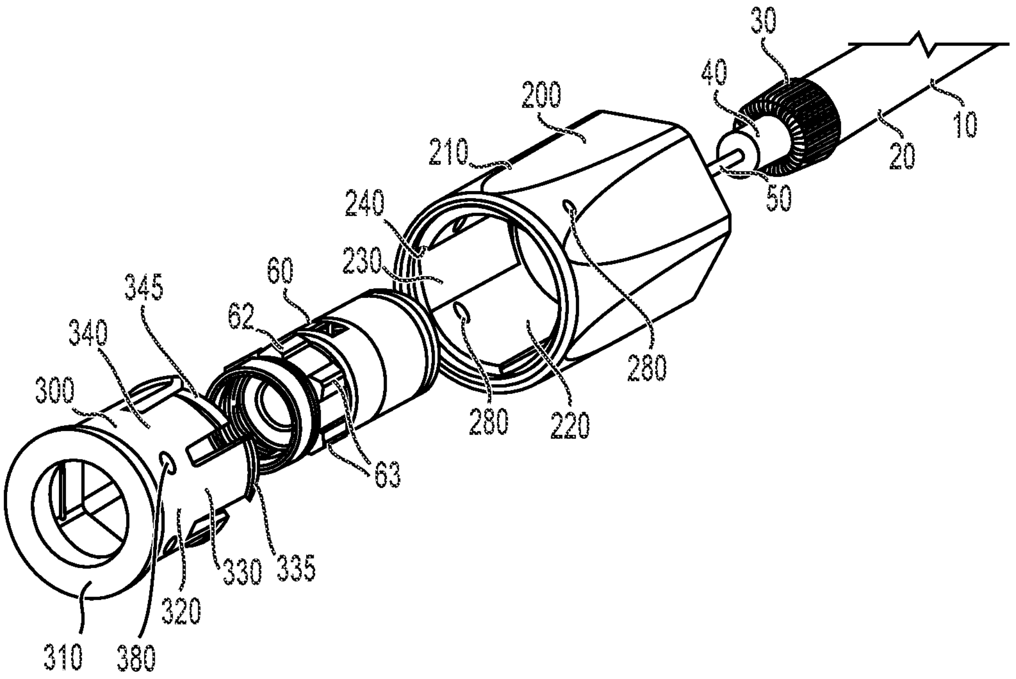
FIG. 3 is an exploded perspective view of the tamper resistant connector security sleeve of FIG. 1 with the connector in a compressed state after connection to the cable.
Figure 4:
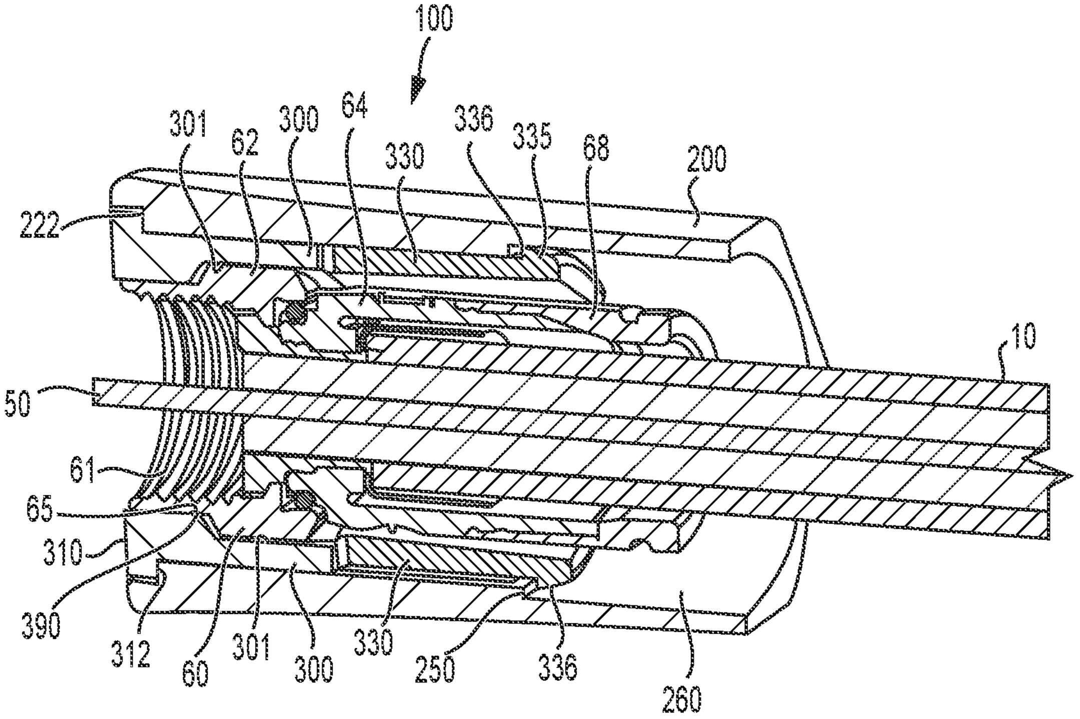
FIG. 4 is a perspective sectional view of the tamper resistant connector security sleeve of FIG. 1 in an installed state.

FIG. 1 shows an exemplary security sleeve system 100 attached to a coaxial cable connector that is attached to a coaxial cable 10. In this example, security sleeve system 100 includes a second part, such as for example, an outer part 200 and a first part, such as, for example, an inner part 300. FIG. 2 shows security sleeve system 100 separated into its components and shows a coaxial connector 60 and coaxial cable 10. In this example, coaxial cable 10 includes an outer sheath 20, a grounding braid 30, a dielectric insulator 40, and a center conductor 50. Coaxial connector 60 has compression sections 64, 68 that slide relative to each other when coaxial connector 60 is attached to coaxial cable 10 (as shown in FIGS. 3 and 4). In this example, coaxial connector 60 has a hex nut 62 including projections 63. Hex nut 62 also includes threads 61 that are structurally configured to connect to a mating connector. Coaxial connector 60 has a rear body 68 at its rear end.

As shown in FIGS. 2 and 3, outer part 200 has a gripping portion 210 that is, in this example a number of flat areas that facilitate turning of outer part 200 by a user. Outer part 200 has a number of engagement protrusion engagement portions 240 protruding from an inner surface of outer part 200. In this example, engagement protrusion engagement portions 240 are ledges that extend radially toward a central axis of outer part 200. An inner surface 220 of outer part 200 transitions outwardly to form an adjacent surface 230 to create the engagement portion 240. Outer part 200 also has a plurality of tool receiving holes 280 that will be discussed in detail below.

FIGS. 2 and 3 show inner part 300 having a main body 320 from which a number (in this case, three) rotary engagement portions, such as, for example, rotary engagement fingers 340, and a number (in this case, three) axial engagement fingers 330, extend. Each rotary engagement finger 340 has at its end sloped portion, such as, for example, a ramp 345 that has a face 346 at one end of ramp 345. Face 346 is structurally configured to engage with engagement portion 240 of outer part 200 when outer part 200 is rotated in a tightening (in this case, clockwise) direction so that the rotation motion of outer part 200 is transferred to inner part 300. As described below, this clockwise rotation of inner part 300 is transferred to hex nut 62 of coaxial connector 60 to enable coaxial connector 60 to be threaded onto a mating connector such as, for example, a coaxial port. In this example, inner part 300 has a radially extending flange 310 that prevents inner portion 300 from passing through outer part 200. In this example, inner part 300 is prevented from passing through outer part 200 by a rear surface 312 of flange 310 contacting a ledge 222 on outer part 200 (see FIG. 4). In this example, inner part 300 has a plurality of tool receiving holes 380 that will be discussed in detail below.

As mentioned above, FIG. 3 shows connector 60 in a compressed state that is a state in which connector 60 would be when attached to coaxial cable 10. It is noted that although coaxial cable 10 would be connected in this state, it is shown separated from coaxial cable 10 in FIG. 3 to aid in showing the features of security sleeve system 100.

FIG. 4 shows security sleeve system 100 in an installed state on coaxial connector 60. As shown in FIG. 4, inner part 300 and outer part 200 engage each other around coaxial connector 60. FIG. 4 shows inner part 300 inserted into outer part 200 such that rear face 312 of flange 310 contacts ledge 222 of outer part 200. One or more of axial engagement fingers 330 has an engagement protrusion 335 at its end. Engagement protrusion 335 has an engagement face 336 that extends radially outward toward an inner surface of outer part 200. In embodiments, in the installed state shown in FIG. 4, one or more of engagement faces 336 engages a ledge 250 on an inner surface 260 of outer part 200. In embodiments, in the installed state shown in FIG. 4, one or more of engagement faces 336 is farther toward a rear (to the right in FIG. 4) of outer part 200 than ledge 250 such that engagement face 336 does not touch ledge 250, but limits the movement of outer part 200 relative to inner part 300 in a separating direction. In embodiments, the interaction of engagement face 336 and ledge 250 prevents outer part 200 from being separated from inner part 300. In embodiments, assembly of security sleeve system 100 onto coaxial connector 60 includes (after coaxial connector 60 is connected to coaxial cable 10): sliding outer part 200 over inner part 300 such that engagement face(s) 336 engage ledge 250 and lock outer part 300 to inner part 200; and sliding outer part 200 and inner part 300 (engaged with each other) over coaxial connector 60 from a front end (the end with the exposed center conductor 50) until a tightening portion engagement portion, such as, for example, inner faces 301 of inner part 300 engage a tightening portion, such as, for example, outer surfaces of hex nut 62 of coaxial connector 60. In embodiments, inner part 300 is connected to hex nut 62 by one or more interacting features so that inner part 300 cannot move axially relative to hex nut 62. In the example shown in FIG. 4, inner part 300 has a number of (in this case, three) ridges 390 that interact with one or more grooves 65 in hex nut 62.

Figure 5:
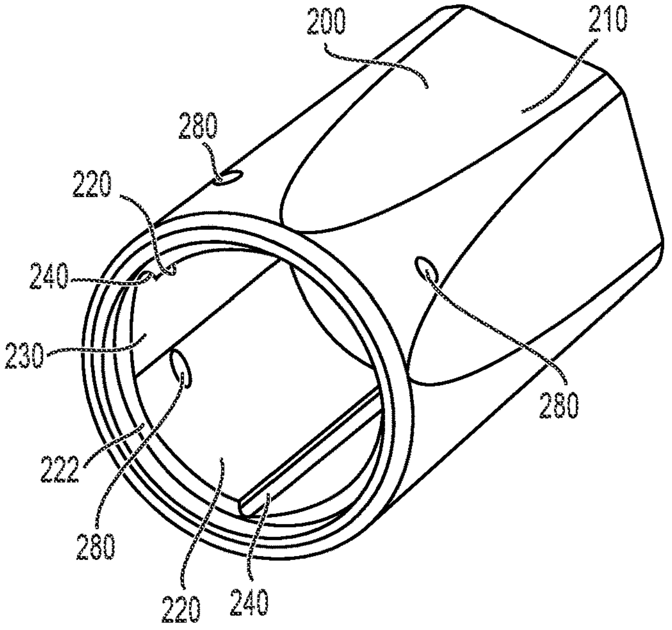
FIG. 5 is a front perspective view of an outer body of the tamper resistant connector security sleeve of FIG. 1.
Figure 6:
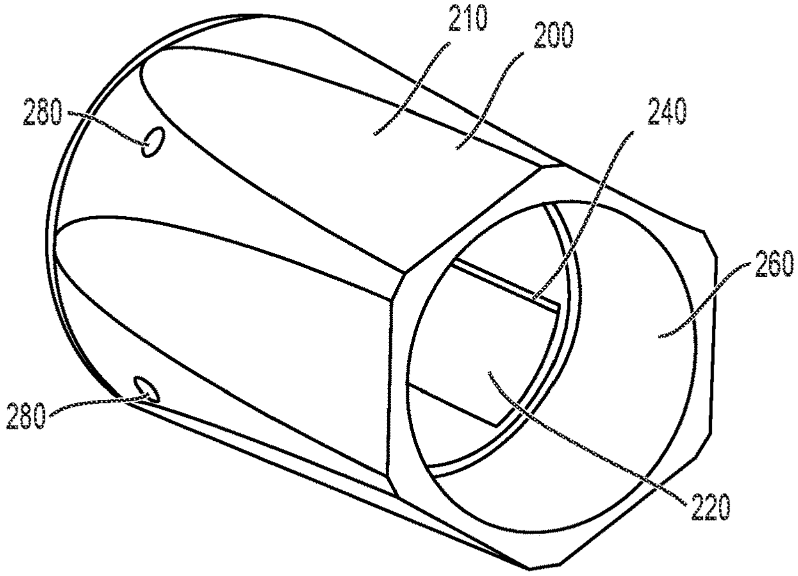
FIG. 6 is a rear perspective view of the outer body of the tamper resistant connector security sleeve of FIG. 1.
Figure 7:
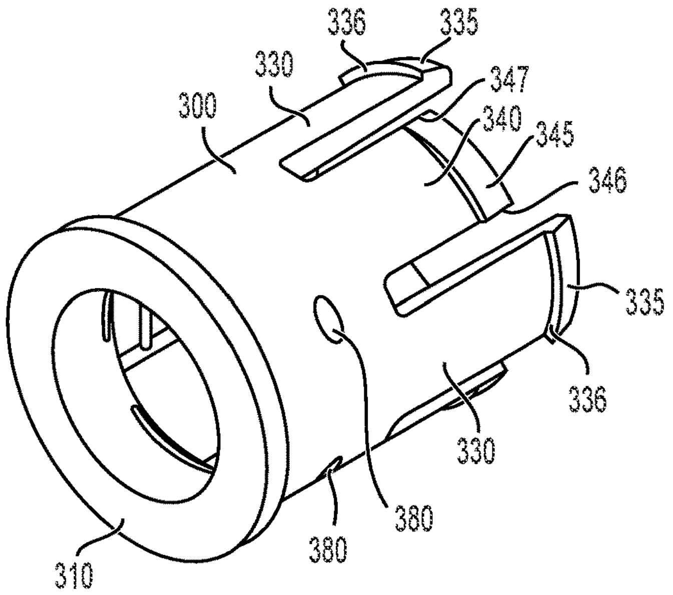
FIG. 7 is a front perspective view of an inner body of the tamper resistant connector security sleeve of FIG. 1.
Figure 8:
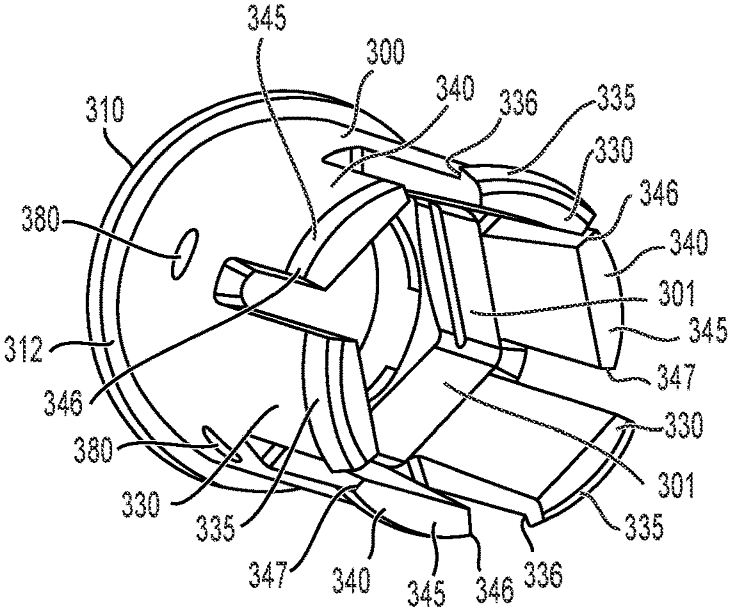
FIG. 8 is a rear perspective view of the inner body of the tamper resistant connector security sleeve of FIG. 1.

FIGS. 5 and 6 show outer part 200 in more detail. FIGS. 7 and 8 show inner part 300 in more detail. FIGS. 7 and 8 show ramps 345 transitioning from a larger end that terminates in face 346 to a smaller end 347. As discussed above, face 346 of ramp 345 engages engagement portion 240 of outer part 200 when outer part 200 is rotated in a tightening direction. Because faces 301 of main body 320 of inner part 300 engage projections 63 (or other portions of hex nut 62), any rotation applied to inner part 300 is transferred to hex nut 62 (and thus threads 61). As a result, rotation of outer part 200 in the tightening direction is transferred to threads 61 and results in coaxial connector 60 being tightened onto the mating connector or port.

However, the structure of inner part 300 and outer part 200 prevent the transfer of rotation in a loosening direction. The ramped shape of ramp 345 does not transfer rotation in the loosening direction from outer part 200 to inner part 300 because there are no engagement portions to transfer such rotation. After installation on coaxial connector 60, rotation of outer part 200 in the loosening direction will cause sloped surface 220 (on the inner surface of outer part 200) to slide over ramp 345 and push ramp 345 (and thus axial engagement finger 330) radially inward. Continuing the rotation of outer part 200 will eventually cause face 346 of axial engagement finger 330 to pass by engagement portion 240 (on the inner surface of outer part 200) without engaging engagement portion 240. As a result, rotation of outer part 200 in the loosening direction is not transferred to inner part 300, and thus not to hex nut 62. In this manner, security sleeve system 100 resists, or prevents, removal of coaxial connector 60 from a mating connector or port unless a tool is used, which will now be described.

Figure 9:
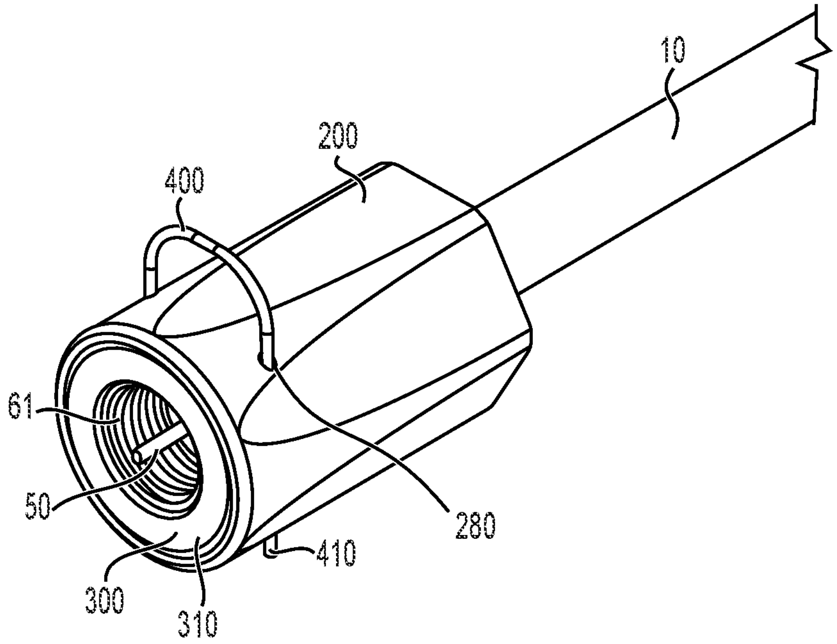
FIG. 9 is a perspective view of the tamper resistant connector security sleeve of FIG. 1 with an exemplary removal tool in an engaged position.
Figure 10:
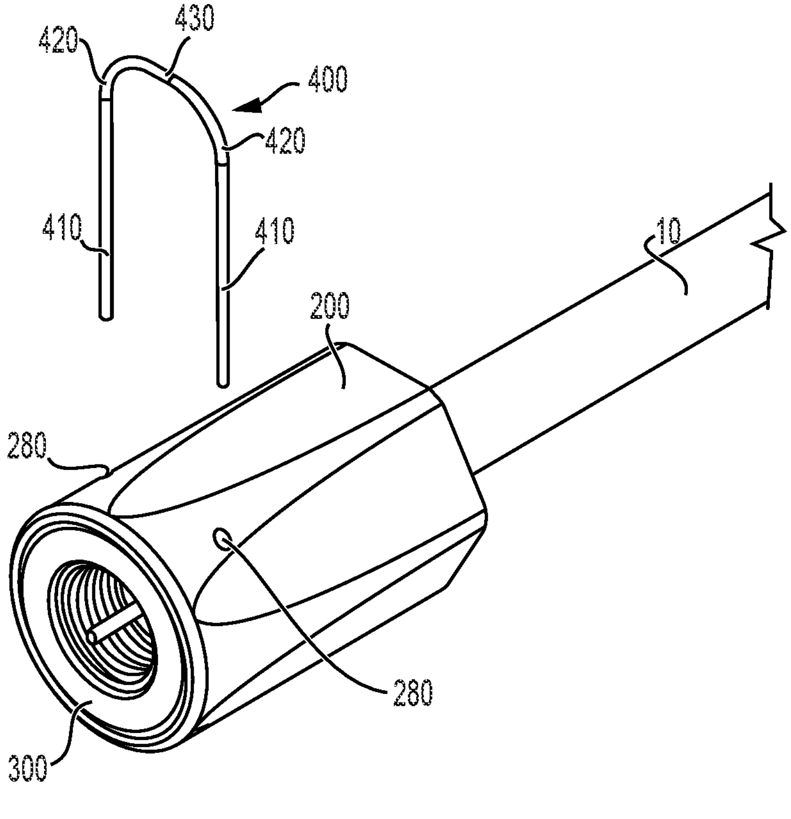
FIG. 10 is a perspective view of the tamper resistant connector security sleeve of FIG. 1 with the exemplary removal tool in a disengaged position.
Figure 11:
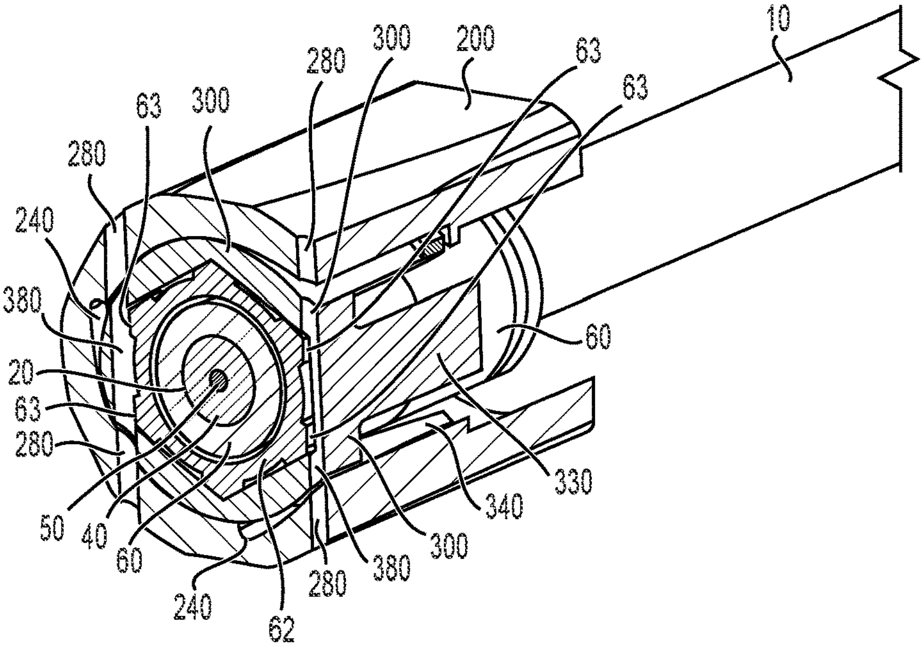
FIG. 11 is a perspective multi-section view of the tamper resistant connector security sleeve of FIG. 1 with no removal tool.
Figure 12:
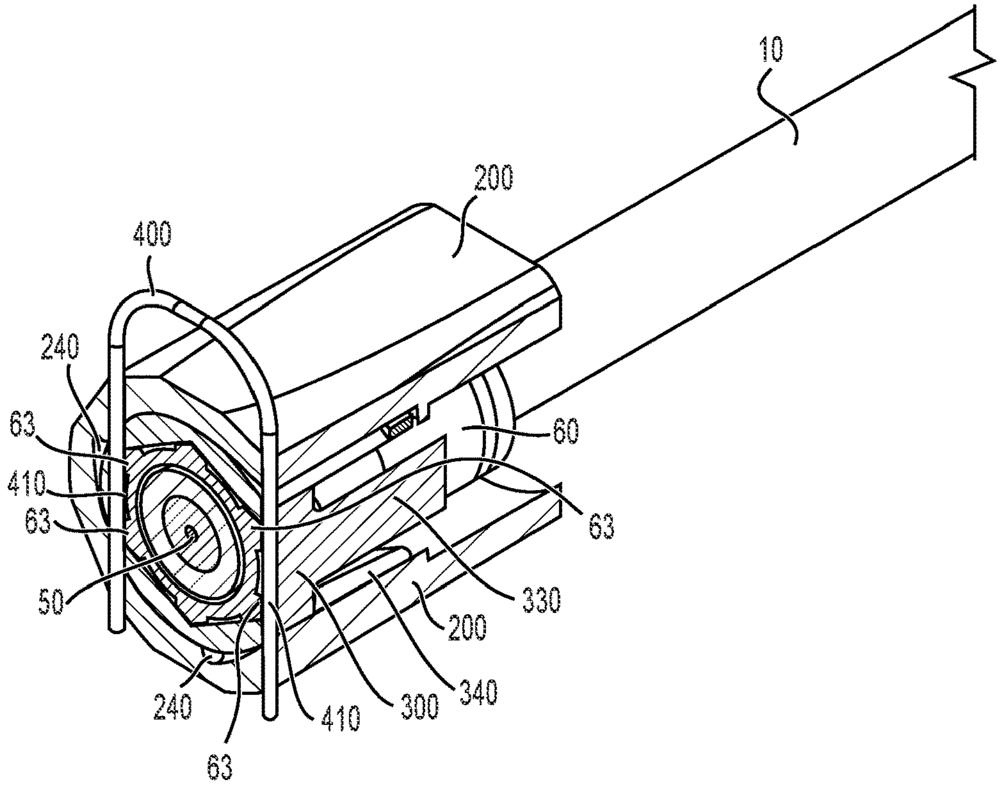
FIG. 12 is a perspective multi-section view of the tamper resistant connector security sleeve of FIG. 1 with the exemplary removal tool in an engaged position.

FIGS. 9-12 show how a tool 400 is used to remove coaxial connector 60 from a mating connector or port. As discussed above, outer part 200 has a plurality of tool receiving holes 280, and inner part 300 has a plurality of tool receiving holes 380. As shown in FIG. 11, tool receiving holes 380 are adjacent to sides (or projections 63) of hex nut 62. Outer part 200 can be rotated relative to inner part 300 so that tool receiving holes 280 align with tool receiving holes 380, as shown in FIG. 11. In the aligned position shown in FIG. 11, a tool 400 can be inserted into tool receiving holes 280 and tool receiving holes 380 as shown in FIG. 12. In the position shown in FIG. 12, straight portions 410 of tool 400 contact hex nut 62 such that hex nut 62 rotates with outer part 200 in both the tightening direction and the loosening direction. As noted above, without tool 400 in place, rotating outer part 200 in the loosening direction will not result hex nut 62 being rotated. As a result, the use of tool 400 as shown in FIGS. 9 and 12 results in a user being able to remove (unscrew) coaxial connector 60 from a mating connector or port while security sleeve system 100 is in place over coaxial connector 60.

The example of tool 400 shown in FIG. 10 includes the two straight portions 410, a center portion 430, and two corner portions 420 that connect straight portions 410 to center portion 420. This is just one example of a tool that can be used to rotationally fix outer part 200 to hex nut 62. Other embodiments include differently shaped tools, but include portions similar to straight portions 410 that are structurally configured to be received by tool receiving holes 280, 380 such that hex nut 62 is prevented from rotating relative to outer part 200. One example of a tool in accordance with embodiments of the disclosure is a common paper clip that is bent to form straight portions 410. By configuring inner part 300 and outer part 200 as described, a paper clip can be used as a tool to allow rotation of hex nut 62 in the loosening direction. This provides the functional result of a tamper resistant security sleeve system that prevents removal of a coaxial connector from a mating connector or port unless a user is aware of the procedure of removal, and the procedure of removal uses a tool that is easily fabricated from a household object such as a paper clip.

In embodiments, tool receiving holes 380 and tool receiving holes 280 align when ramps 345 and in their outward most position. In other embodiments, tool receiving holes 380 and tool receiving holes 280 align when ramps 345 are pushed either partly or completely radially inward, which results in a more difficult alignment of tool receiving holes 380 and tool receiving holes 280. This more difficult alignment can increase security by increasing the difficulty of operating the tool.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A security sleeve system for a cable connector, comprising:

an inner portion structurally configured to engage a tightening portion of the cable connector;

an outer portion structurally configured to receive the inner portion;

wherein the inner portion comprises a tightening portion engagement portion that is structurally configured to engage the tightening portion of the cable connector such that rotation of the inner portion causes the tightening portion to rotate;

wherein the inner portion comprises a rotary engagement portion that is structurally configured to flex in a radial direction;

wherein the inner portion comprises an axial engagement portion that includes an engagement protrusion at an end of the axial engagement portion;

wherein the axial engagement portion is structurally configured to flex in a radial direction;

wherein the outer portion comprises an engagement protrusion engaging portion;

wherein the engagement protrusion of the axial engagement portion is structurally configured to engage the engagement protrusion engaging portion to limit axial movement of the inner portion relative to the outer portion;

wherein the outer portion comprises an engagement portion that is configured to engage the rotary engagement portion to transfer rotation of the outer portion in a tightening direction to the inner portion;

wherein the engagement portion of the outer portion is structurally configured to press a sloped portion of the rotary engagement portion radially inward as a result of the outer portion being rotated in a loosening direction that is opposite to the tightening direction so as to impede rotation of the outer portion in the loosening direction from being transferred to the inner portion;

wherein outer portion comprises a tool receiving portion;

wherein the inner portion comprises a tool receiving portion;

wherein, when the tool receiving portions of the outer portion and the inner portion are aligned, the tool receiving portions of the outer portion and the inner portion are structurally configured to receive a rotation impeding tool that impedes rotation of the outer portion relative to the inner portion so as to allow the inner portion to cause the tightening portion of the cable connector to rotate in the loosening direction; and wherein the inner portion and the outer portion are structurally configured to provide tightening of the cable connector to a mating part without requiring use of a tool but are structurally configured to use the rotation impeding tool to loosen the cable connector from the mating part such that unauthorized disassembly of the cable connector from the mating part is impeded.

2. The security sleeve system of claim 1, wherein the sloped portion is structurally configured as a ramp.

3. The security sleeve system of claim 1, wherein the rotary engagement portion is structurally configured to extend axially from the inner portion.

4. The security sleeve system of claim 1, wherein the rotary engagement portion comprises a sloped portion at an end of the rotary engagement portion, and the sloped portion comprises a face at a tall end of the sloped portion.

5. The security sleeve system of claim 1, wherein the axial engagement portion is structurally configured to extend axially from the inner portion.

6. The security sleeve system of claim 1, wherein the engagement protrusion engaging portion is structurally configured to extend radially inward from an inner surface of the outer portion.

7. The security sleeve system of claim 1, wherein the engagement protrusion engaging portion comprises a ledge.

8. The security sleeve system of claim 1, wherein the tightening portion engagement portion comprises a plurality of tightening portion engagement portions.

9. The security sleeve system of claim 1, wherein the tightening portion of the cable connector comprises a hex nut.

10. The security sleeve system of claim 1, wherein the rotary engagement portion comprises a plurality of rotary engagement portions.

11. The security sleeve system of claim 1, wherein the rotary engagement portions are rotary engagement fingers.

12. The security sleeve system of claim 1, wherein the axial engagement portion comprises a plurality of axial engagement portions.

13. A security sleeve system for a cable connector, comprising:

an inner portion structurally configured to engage a tightening portion of the cable connector;

an outer portion structurally configured to selectively engage the inner portion;

wherein the inner portion comprises a tightening portion engagement portion that is structurally configured to engage the tightening portion of the cable connector such that rotation of the inner portion causes the tightening portion to rotate;

wherein the inner portion comprises an engagement portion;

wherein the outer portion comprises an engagement portion engaging portion that is structurally configured to engage the engagement portion engaging portion to limit axial movement of the inner portion relative to the outer portion;

wherein the outer portion comprises an engagement portion that is configured to engage the inner portion to transfer rotation of the outer portion in a tightening direction to the inner portion;

wherein the outer portion comprises a tool receiving portion;

wherein the inner portion comprises a tool receiving portion;

wherein the tool receiving portions of the outer portion and the inner portion are structurally configured to receive a rotation impeding tool that impedes rotation of the outer portion relative to the inner portion to cause the tightening portion of the cable connector to rotate in the loosening direction; and wherein the security sleeve system provides tightening of the cable connector to a mating part without requiring the use of a tool but are structurally configured to use the rotation impeding tool to loosen the cable connector from the mating part such that unauthorized disassembly of the cable connector from the mating part is impeded.

14. The security sleeve system of claim 13, wherein the inner portion comprises a rotary engagement portion.

15. The security sleeve system of claim 14, wherein the rotary engagement portion is structurally configured to flex in a radial direction.

16. The security sleeve system of claim 13, wherein the engagement portion of the inner portion comprises an axial engagement portion.

17. The security sleeve system of claim 16, wherein the axial engagement portion comprises an engagement protrusion at an end of the axial engagement portion.

18. The security sleeve system of claim 17, wherein the axial engagement portion is structurally configured to flex in a radial direction.

19. The security sleeve system of claim 13, wherein the engagement portion of the outer portion is structurally configured to press a sloped portion of the rotary engagement portion radially inward as a result of the outer portion being rotated in a loosening direction that is opposite to the tightening direction.

20. The security sleeve system of claim 19, wherein the pressing of the sloped portion radially inward impedes the rotation of the outer portion in the loosening direction from being transferred to the inner portion.

21. The security sleeve system of claim 13, wherein when the tool receiving portions of the outer portion and the inner portion are aligned, the tool receiving portions of the outer portion and the inner portion are structurally configured to receive the tool.

22. A security sleeve system for a cable connector, comprising:

a first portion structurally configured to engage a tightening portion of the cable connector;

a second portion structurally configured to selectively engage the first portion;

wherein the first portion is structurally configured to engage the tightening portion of the cable connector such that rotation of the first portion in a tightening direction causes the tightening portion to rotate;

wherein the first portion and the second portion are structurally configured to receive a rotation impeding tool that impedes rotation of the second portion relative to the first portion to cause the tightening portion of the cable connector to rotate in the loosening direction;

wherein the second portion is structurally configured to rotate relative to the first portion when the rotation impeding tool is not received in the first portion; and wherein the first portion and the second portion are structurally configured to provide tightening of the cable connector to a mating part without requiring the use of a tool but are structurally configured to use the rotation impeding tool to loosen the cable connector from the mating part such that unauthorized disassembly of the cable connector from the mating part is impeded.

23. The security sleeve system of claim 22, wherein the first portion is an inner portion.

24. The security sleeve system of claim 23, wherein the second portion is an outer portion.

25. The security sleeve system of claim 22, wherein the first portion comprises an engagement portion, and the second portion comprises an engagement portion engaging portion.

26. The security sleeve system of claim 25, wherein the engagement portion of the first portion is structurally configured to engage the engagement portion engaging portion to limit axial movement of the first portion relative to the second portion.

27. The security sleeve system of claim 22, wherein the second portion comprises an engagement portion, and the engagement portion of the second portion is configured to engage the first portion to transfer rotation of the second portion in the tightening direction to the first portion.

28. A device for impeding unauthorized disassembly of an enhanced tamper resistant connector security sleeve assembly for a cable connector:

an enhanced tamper resistant connector security sleeve assembly comprising:

a first portion structurally arranged to engage a tightening portion of the cable connector; and a second portion structurally arranged to selectively engage the first portion;

wherein the first portion and the second portion are structurally arranged to rotate together in a tightening direction to tighten the tightening portion of the cable connector to a mating port without requiring use of a tool;

wherein the first portion and the second portion are structurally arranged to receive a rotation impeding tool that impedes rotation of the second portion relative to the first portion such that the first portion and the second portion are permitted to rotate together in a loosening direction to loosen the tightening portion of the cable connector from the mating port;

wherein the second portion is structurally arranged to rotate relative to the first portion when the rotation impeding tool is not received in the first portion; and wherein the connector security sleeve assembly is structurally arranged to impede unauthorized disassembly of the cable connector from the mating part by requiring the rotation impeding tool to be received in the first portion to loosen the cable connector from the mating part.

29. The security sleeve system of claim 28, wherein the first portion comprises an inner portion.

30. The security sleeve system of claim 29, wherein the second portion comprises an outer portion.

31. The security sleeve system of claim 28, wherein the first portion comprises an engagement portion, and the second portion comprises an engagement portion engaging portion.

32. The security sleeve system of claim 31, wherein the engagement portion of the first portion is structurally arranged to engage the engagement portion engaging portion to limit axial movement of the first portion relative to the second portion.

33. The security sleeve system of claim 28, wherein the second portion comprises an engagement portion, and the engagement portion of the second portion is arranged to engage the first portion to transfer rotation of the second portion in the tightening direction to the first portion.

* * * * *